United States Patent

[11] 3,584,796

[72] Inventors Paul Lewis Earle
Martinsville;
Andrew Musz, Raritan, both of, N.J.
[21] Appl. No. 829,476
[22] Filed June 2, 1969
[45] Patented June 15, 1971
[73] Assignee Johns-Manville Corporation
New York, N.Y.

[54] MANUFACTURE OF GLASS FIBER BLOWING WOOL
12 Claims, 2 Drawing Figs.

[52] U.S. Cl. .................................................. 241/4,
241/18, 241/29
[51] Int. Cl. ......................................................... B02c 18/06,
B02c 18/22, B02c 23/06

[50] Field of Search............................................ 65/111;
241/4, 15—19, 24, 27, 29, 49, 50

[56] References Cited
UNITED STATES PATENTS
| | | | |
|---|---|---|---|
| 1,417,961 | 5/1922 | Williams........................ | 241/18 |
| 2,225,781 | 12/1940 | Hinerfeld ...................... | 241/49 X |
| 2,679,933 | 6/1954 | Lockhart....................... | 241/4 X |

*Primary Examiner*—Donald G. Kelly
*Attorneys*—John A. McKinney and Robert M. Krone

ABSTRACT: Glass fiber blowing wool is produced from bonded glass fiber material containing about 3 percent to about 15 percent by weight of binder and having a density in the range of about 0.2 to about 20 pounds per cubic foot by cutting the material and immediately removing the severed material from the cutting area by suction through a screen.

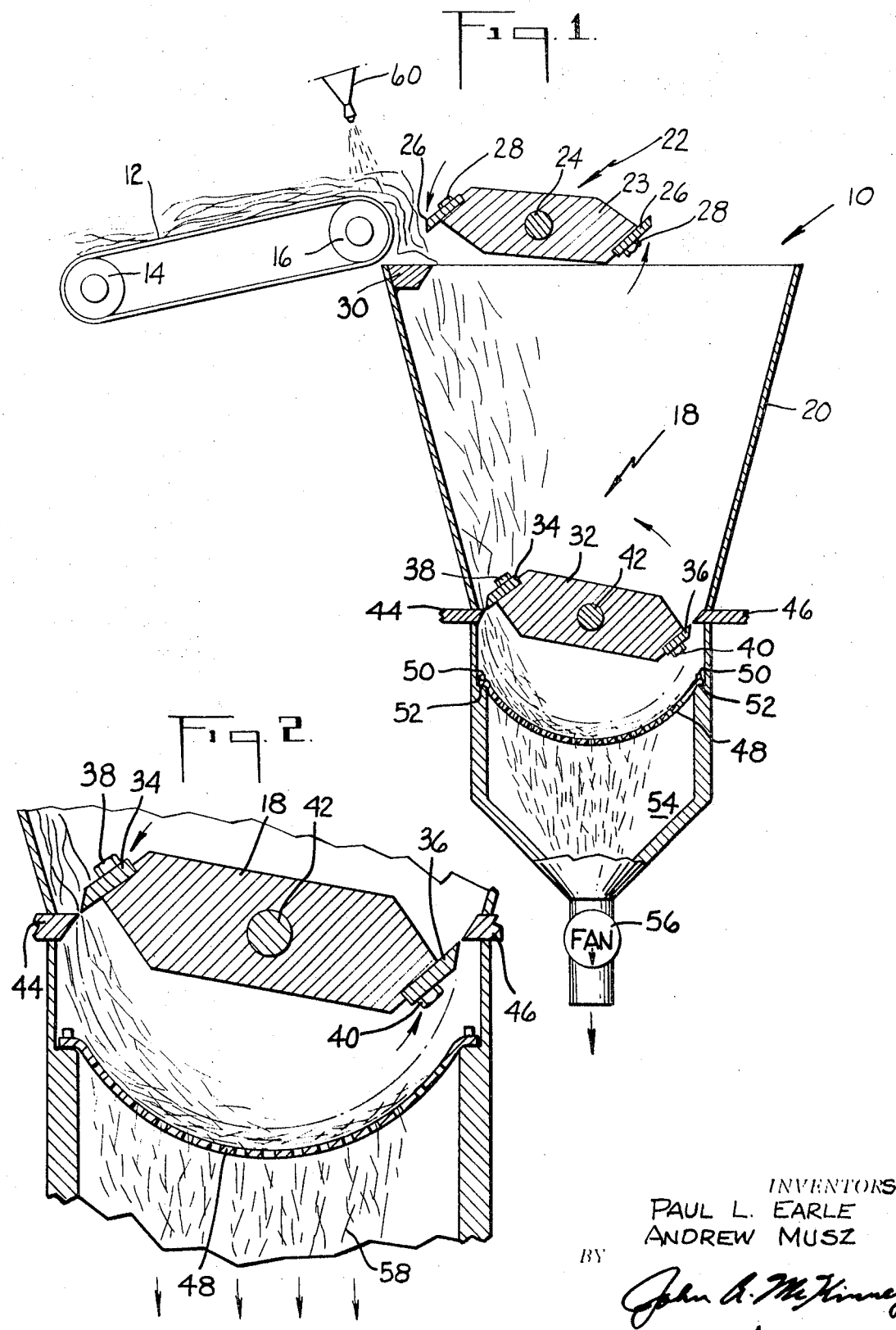
PATENTED JUN 15 1971
3,584,796
INVENTORS.
PAUL L. EARLE
ANDREW MUSZ
BY
John A. McKinney
ATTORNEY

MANUFACTURE OF GLASS FIBER BLOWING WOOL

BACKGROUND OF THE INVENTION

This invention relates broadly to the manufacture of glass fiber blowing wool, and more particularly to the manufacture of glass fiber blowing wool having a low dust content.

The use of glass fiber blowing wool as thermal insulation is well known and is preferred by many contractors because it can be applied quickly and easily and is a relatively low cost material. Conventionally, such blowing wool is produced from bonded glass fiber of low density, usually not more than about 1 pound, or at the most 2 pounds, per cubic foot, which is crushed to small size by a hammermill. The applicator, who receives the material in bags, introduces the blowing wool to blowing apparatus which first mixes or fluffs it to break up clumps and then blows it by means of a fan through a distribution hose. A workman sprays the material on the surface to be insulated, generally the floor of an attic or crawl space, until a predetermined depth is reached which corresponds to the desired degree of thermal conductivity.

A major problem associated with the application of blowing wool is the dust generated during the spraying operation. Not only is a glass fiber dust laden atmosphere a source of discomfort, causing itching, but it is a health hazard as well. Protective face masks do little to alleviate the problem of discomfort since other unprotected parts of the body are usually exposed, and they often have little effect in preventing inhalation of dust because workmen are generally disinclined to wear commercially available face masks for any length of time. The creation of excessive dust during the milling operation is a major cause of such airborne dust at the application site.

Another problem is the inability to convert to blowing wool bonded glass fiber, such as glass fiber scrap, of higher density than 2 pounds per cubic foot. Attempts to do so have been unsuccessful because the repeated beating and pulverizing action of the milling operation produces significantly greater amounts of dust than even the high amounts produced by milling low density material, probably because the more compacted higher density material tends to shatter and crumble more easily than the more resilient lower density material. In addition to being unable to use higher density glass fiber scrap, which otherwise must be disposed of at considerable expense, production of glass fiber blowing wool entirely from low density material creates a disadvantage to the home owner. Blowing wool of such low density when applied to a predetermined depth usually gives less insulation than the design value of the material because it tends to cover more than the intended amount of surface area due to its light, fluffy nature.

Prior to this invention, the problems mentioned above were simply tolerated doe to lack of a better method of producing glass fiber blowing wool. It was generally believed that the milling operation could not be changed to a different type of fiber reducing operation, such as a cutting or chopping operation, because such a change would not improve the quality of blowing wool and could well create other problems. Disadvantages of a cutting operation, for example, were an inability to process a sufficient volume of material for commercial needs due to the difficulty of removing it from the cutter station at a high enough rate, inability to control the fiber size to a range which would not plug the blowing wool distribution hose, and inability to prevent the creation of dust due to the cutter making multiple cuts of the glass fiber material. Thus it appeared that the milling operation, by its nature, could not be improved to reduce the dust content of blowing wool or enable use of higher density material, and that other fiber reducing processes would be no better, and very likely worse, in the area of dust production. Further, it was expected that other types of fiber reducing processes would introduce problems in other areas.

OBJECTS OF THE INVENTION

The main object of this invention is to produce a glass fiber blowing wool which does not create excessive dust when applied.

Another object is to make use of glass fiber material of higher density than the low density material to which the industry has been limited.

SUMMARY OF THE INVENTION

The objects of the invention are met by employing a cutting operation instead of a milling operation to reduce bonded glass fiber material to appropriate size while at the same time employing a pressure differential to draw off the severed particles of glass fibers, preferably through a screen having openings of predetermined dimensions. With such an arrangement, it has been found that it is not necessary to follow the conventional practice of employing a hammermill to crush or pulverize such glass fiber material to particle sizes suitable for use as blowing wool.

In implementing the cutting operation, in order to provide a practical, economical manufacturing operation, and to produce blowing wool of suitable quality, certain processing conditions should be maintained. With respect to the material itself, the binder content should not be lower than about 3 percent or higher than about 15 percent, both percentages being by weight of the bonded glass fiber. If it contains no binder or less than about 3 percent binder, the blowing wool has insufficient resiliency to be compressed in bags for shipping and subsequently to be blown in place at the desired density and in the desired quantity. Without sufficient binder, the glass fiber material cannot be maintained in low density condition and would be merely packed together, producing a relatively dense mass which does not yield satisfactory coverage when blown in place. If it contains more than about 15 percent binder the binder itself, because it is present in such large quantities and because it most likely has been subjected to a rather long drying or baking operation and is especially susceptible to crumbling during the fiber-reducing operation, is the cause of excess dust as a result of being crushed in the reducing operation.

Densities of glass fiber material in the range of about 0.2 to 20 pounds per cubic foot can be used in the process of the invention. Material of lower density than about 0.2 pound per cubic foot cannot readily be used as blowing wool because its light, fluffy nature makes it very difficult to both obtain adequate coverage in a blowing wool installation and also provide adequate insulating value. Material of higher density than about 20 pounds per cubic foot is not satisfactory because it does not have enough insulating value.

With respect to the equipment, cutters are employed which chop the glass fiber material into lengths suitable for use as blowing wool particles, which preferably should not be longer than about two inches in order to insure that they can be blown without clogging through distribution hoses of 2 inch diameter, the minimum hose diameter generally in use in the blowing wool industry. In order to prevent the creation of dust particles caused by repeated cutting of glass wool lengths after they have been severed from the mass of material entering the cutting area and to permit processing of large volumes of material, the severed material is drawn off by suction through a screen having openings of a size corresponding to the maximum length of fibers it is desired to produce.

DESCRIPTION OF THE DRAWING

The nature of the invention will be more fully understood and other objects may become apparent when the following detailed description is considered in connection with the accompanying drawing, wherein:

FIG. 1 is a diagrammatic representation of a process for producing glass fiber blowing wool in accordance with the present invention; and FIG. 2 is an enlarged sectional view taken through a portion of the equipment at the cutting area.

DETAILED DESCRIPTION OF THE INVENTION

Referring to FIG. 1, glass fiber material is fed to a cutting apparatus 10 by endless conveyor 12 trained about rolls 14 and 16. The cutting equipment includes a rotary cutter 18 located at the lower end of a funnellike hopper 20. If desired, a preliminary cutter or shredder may be located at the inlet to the hopper, as indicated at 22, in order to shred bulky material into smaller portions which are more easily fed to the main cutter 18. As illustrated, the cutter 22 consists of a support member 23 mounted on an axis 24 and carrying at spaced points on its periphery cutting blades 26, attached to the support by suitable means such as bolts 28. These blades 26, sometimes referred to as flying knives or rotary knives, cooperate with stationary bed knife 30, located adjacent the terminal portion of the conveyor 12. Both the rotating blades and the bed knife extend for considerable distances parallel to the axis 24 and are able to contact and shred material along the full width of the conveyor feeding the material into the hopper. The spacing of the rotary knives and stationary bed knife from the entrance to the hopper preferably is such that the resulting particles are not of the small size required for blowing wool, but yet are sufficiently small to be readily handled by the main cutter 18. A typical strip of material cut by the cutter 22 may be about 4 inches wide. While it is not essential to have a preshredding operation such as that just described, it has been found that in commercial practice the preshredder is effective in insuring that high production speed can be maintained even though the size, shape and density of bonded glass fiber material fed to the cutter may vary considerably.

The main cutter 18 is located adjacent the outlet of the hopper. The cutter illustrated is similar to the cutter 22 and consists of a main support body 32 carrying two knives 34 and 36, both of which are attached to the support body by suitable means such as bolts 38 and 40. The knife support rotates about axis 42 such that the blades cooperate with stationary bed knives 44 and 46 mounted at opposite sides of the hopper outlet. During operation the knives 34 and 36 cooperate with both the stationary knives 44 and 46 as described more fully hereinafter.

Immediately below the rotary knife 18 is a screen 48 attached to the hopper support by suitable means such as bolts 50 which secure a peripheral flange of the screen to the support at horizontal ledge portions 52. The screen 48 contains openings of a size corresponding to the maximum particle size it is desired to produce. Connected to the cutting area or chamber between the cutter and the screen, and to the compartment 54 leading away from the screen, is a fan 56 of sufficient capacity to pull the particles through the screen and through further suitable conduits to other handling and packaging stations.

In operation, material is fed to the hopper 20 by conveyor 12 and, if desired, may be cut into smaller lengths by the preshredder 22. It then falls by gravity to the main rotary cutter 18. As illustrated more clearly in FIG. 2, the rotary cutting blades 34 and 36 cooperate with both the bed knives 44 and 46 so that upon rotation they cut material at knife 44, thus carrying the severed lengths into the portion of the cutting chamber between the screen 48 and the cutter 18, and also at knife 46, where any material which is too large to pass through the screen 48 and has been carried and pushed to the bed knife 46 by the movement of the rotary blades and the mass of severed material, is severed and prevented from reentering the hopper.

As indicated by reference numeral 58, the severed particles are drawn through the screen 48 by the fan 56. It is necessary to employ an adequate pressure differential, such as suction, at this point since if gravity alone or gravity in conjunction with mechanical takeoff means were relied upon to remove the severed particles from the cutting area, they would not be removed fast enough to counter the tendency of the centrifugal force of the rotary cutter to hold the material in the cutting area or to prevent a buildup of material between the screen and the rotating knife. This would result in recutting much of the glass fiber material and would produce extra amounts of the minute particles which cause dust when the blowing wool is applied. In addition to preventing the creation of excessive dust, the suction means prevents the severed glass fiber material from clogging the cutting area and requiring the equipment to be shut down for cleaning.

In addition to use of the process and equipment described above, the material may be additionally treated to reduce the amount of dust resulting from application of the blowing wool. A suitable hygroscopic material, preferably one which does not cause rusting, such as ethylene glycol, may be applied to the glass fiber. A convenient location for such application is in the area of the cutting equipment, at either the primary cutter 18 or the preshredder 22. For example, in FIG. 1, nozzle 60 is illustrated as being directed toward the material as it leaves the conveyor 12 and enters the region of the cutter 22. In addition to antidust treatment, antistatic treatment is significant in combating static electricity caused by the passage of blowing wool through plastic distribution hoses, which can be quite long, in the order of about 150 to 200 feet. Development of a static charge causes the glass fibers when blown, particularly during periods of low humidity, to cling to the applicator and to structures adjacent the surface being covered. A suitable material for antistatic treatment is polyethylene glycol, such as the material known as antistatic Agent 575, manufactured by E. F. Houghton & Company of Philadelphia, Pennsylvania. The application of antidust and antistatic materials is preferably carried out by spraying an aqueous mixture of the ingredients in suitable amounts, such as about 2 percent antidust material and only a trace, in the order of 0.02 percent, antistatic material, both percentages being by weight of the final blowing wool product.

It should be understood that the specific design of the equipment shown in the drawing is illustrative only and that design changes can be made without departing from the spirit of the invention.

The invention is not limited to the use of any particular type of binder. Any binder suitable for bonding glass fibers together in batt or mat form can be used with glass fibers to form the bonded glass fiber material which is cut into lengths suitable for use as blowing wool. Examples of such binders are reaction products of the phenols, cresols, resorcinols, and their derivatives, and the like, with an aldehyde; reaction products of nitrogeneous resin forming compounds, such as urea and melamine, with an aldehyde, such as formaldehyde; and other condensation reaction products of furfuryl alcohol, furfural, aniline, and the like.

The invention provides a simple process for producing glass fiber blowing wool from bonded glass fiber material, such as glass fiber scrap, which produces far less dust than the previously employed hammermill operation and also permits the of a great deal of scrap which was previously not able to be processed by the milling operation. In addition, the resulting blowing wool is a uniform product which can readily be maintained at a density in a preferred range of about 0.5 to 0.6 pound per cubic foot when blown in place. This is possible by controlling the blending of high and low density materials. This takes advantage of the good insulating value of the higher density material, which heretofore could not be used in the manufacture of blowing wool, and prevents "overblowing," which is the result of blowing very low density material in such a manner that it covers more area than it should in order for it to provide the design value of thermal insulating effect. With a uniform product of this type little settling will occur as will happen when very low density material alone is used.

What we claim is:

1. A process for producing glass fiber blowing wool having a low dust content, comprising the steps of:

a. feeding bonded glass fiber material to a cutting station, the binder being present in the amount of about 3 percent to about 15 percent by weight of the bonded material and the bonded material having a density in the range of about 0.2 to about 20 pounds per cubic foot, b. cutting the bonded material to a size suitable for use as blowing wool, and c. providing a pressure differential at the cutting area to remove the severed bonded glass fiber material therefrom.

2. A process as recited in claim 1, including the additional step of passing the severed bonded glass fiber material, as it is removed from the cutting area, through a screen having openings therein of predetermined dimensions.

3. A process as recited in claim 1, wherein the pressure differential at the cutting area is caused by a fan downstream from the cutting area.

4. A process as recited in claim 2, including the additional step of cutting the bonded material, prior to feeding it to the cutting station, to a size which is generally to large to pass through the screen.

5. A process for producing glass fiber blowing wool having a low dust content, comprising the steps of:

a. feeding bonded glass fiber material to a cutting station, the binder being present in the amount of about 3 percent to about 15 percent by weight of the bonded material and the bonded material having a density in the range of about 0.2 to about 20 pounds per cubic foot, b. cutting the bonded material to a size suitable for use as blowing wool, and c. immediately removing the severed bonded material by suction from the cutting area through a screen having openings therein of predetermined dimensions.

6. A process as recited in claim 5, wherein the cutting station comprises a cutting chamber and a rotary knife cooperatively associated with a stationary knife position adjacent the entrance to the cutting chamber, the clearance between the rotary knife and the cutting chamber at the location at which the rotary knife moves out of the cutting chamber being too small to permit substantial amounts of bonded glass fiber material from being carried by the rotary knife out of the cutting chamber.

7. A process as recited in claim 6, wherein a second stationary knife is positioned adjacent the location at which the rotary knife moves out of the cutting chamber.

8. A process as recited in claim 5, wherein the largest dimension of the openings in the screen is about 2 inches.

9. A process as recited in claim 5, including additionally the step of cutting the bonded glass fiber material, prior to feeding it to the cutting station, to a size which is generally too large to pass through the screen.

10. A process as recited in claim 9, wherein the bonded glass fiber material is first fed to a rotary cutting apparatus for cutting the material to a size generally too large to pass through the screen, and the thus severed material is fed to the cutting station for cutting the material to a size suitable for use as blowing wool.

11. A process as recited in claim 5, including the additional step of treating the bonded glass fiber material with a hygroscopic composition to further reduce the formation of dust.

12. A process as recited in claim 5, including the additional step of treating the bonded glass fiber material with an antistatic agent to reduce the effects of static electricity created during application of the blowing wool by spraying equipment.